US011556840B2

(12) United States Patent
Jones et al.

(10) Patent No.: US 11,556,840 B2
(45) Date of Patent: Jan. 17, 2023

(54) HIGH-SPEED SCANNING PARSER FOR SCALABLE COLLECTION OF STATISTICS AND USE IN PREPARING DATA FOR MACHINE LEARNING

(71) Applicant: IQVIA Inc., Danbury, CT (US)

(72) Inventors: Gwyn Rhys Jones, Sevenoaks (GB); Nicola Lazzarini, London (GB); Charikleia Eleftherochorinou, London (GB); Karolina Katarzyna Dluzniak, Brentford (GB); Tomass Bernots, Ottawa (CA)

(73) Assignee: IQVIA Inc., Durham, NC (US)

( * ) Notice: Subject to any disclaimer, the term of this patent is extended or adjusted under 35 U.S.C. 154(b) by 902 days.

(21) Appl. No.: 16/408,764

(22) Filed: May 10, 2019

(65) Prior Publication Data
US 2020/0356896 A1 Nov. 12, 2020

(51) Int. Cl.
*G06N 20/00* (2019.01)
*G06F 12/02* (2006.01)
*G06F 9/54* (2006.01)

(52) U.S. Cl.
CPC ............. *G06N 20/00* (2019.01); *G06F 9/544* (2013.01); *G06F 12/0284* (2013.01); *G06F 2212/7202* (2013.01)

(58) Field of Classification Search
CPC ........ G06N 20/00; G06N 20/10; G06N 20/20; G06F 16/258; G06F 16/25; G06F 16/252; G06F 9/544; H04L 49/90
See application file for complete search history.

(56) References Cited

U.S. PATENT DOCUMENTS

| 8,843,427 B1 * | 9/2014 | Lin ........................ G06N 20/00 705/16 |
| 2008/0155221 A1 | 6/2008 | Bireley et al. |
| 2019/0079984 A1 | 3/2019 | Lancaster et al. |

OTHER PUBLICATIONS

D. Bolton, "What Does It Mean to Buffer in C++?," Thoughtco website, downloaded from https://www.thoughtco.com/definition-of-buffer-p2-958030, published on Jan. 18, 2019 (Year: 2019).*

(Continued)

*Primary Examiner* — Eric J Yoon
(74) *Attorney, Agent, or Firm* — John Maldjian; Stevens & Lee

(57) ABSTRACT

A parser is deployed early in a machine learning pipeline to read raw data and collect useful statistics about the raw data's content to determine which items of raw data exhibit a proxy for feature importance for the machine learning model. The parser operates at high speeds that approach the disk's absolute throughput while utilizing a small memory footprint. Utilization of the parser enables the machine learning pipeline to receive a fraction of the total raw data that would otherwise be available. Several scans through the data are performed, by which proxies for feature importance are indicated and irrelevant features may be discarded and thereby not forwarded to the machine learning pipeline. This reduces the amount of memory and other hardware resources used at the server and also expedites the machine learning process.

20 Claims, 15 Drawing Sheets

(56) References Cited

OTHER PUBLICATIONS

Extended European Search Report dated Sep. 28, 2020 in connection with corresponding European Patent Application No. 20173786.3 (9 pages total).
European Office Action dated Sep. 29, 2022 in connection with corresponding European Patent Application No. 20173786.3 (5 pages total).

* cited by examiner

1500

HIGH-SPEED SCANNING PARSER FOR SCALABLE COLLECTION OF STATISTICS AND USE IN PREPARING DATA FOR MACHINE LEARNING

BACKGROUND

Machine learning approaches developed across industries (e.g., in commercial and academic organizations) typically utilize an entire dataset loaded in memory to train the machine learning model. Companies with large datasets quickly hit the limits of the amount of memory that a single server can be equipped with when developing large-scale machine learning operations. Even with continuous investments in hardware, the problem remains that volume of data scales disproportionally to the investments.

Some solutions utilize distributed computing technologies (e.g., Apache Spark™) which can be a costly endeavor due to the increased complexity associated with using multiple machines, including the networking and the overhead associated with constant monitoring and maintenance. Other solutions include manually removing parts of data so that the entire dataset can fit in memory on a single server, but this approach can be time-consuming and can lead to a less performant predictive model.

SUMMARY

A parser is deployed early in a machine learning pipeline to read raw data and collect useful statistics about the raw data's content to determine which pieces of the raw data to feed into the remainder of the pipeline. The parser operates at high speeds that approach the disk's absolute throughput while utilizing a small memory footprint. Utilization of the parser enables the machine learning pipeline to receive a fraction of the total raw data which exhibits information that are proxies for feature importance to the machine learning model. This reduces the necessary amount of memory and other hardware resources used subsequently in the pipeline and also expedites the machine learning process.

Multiple stages are utilized by the parser to create a catalogue of data characteristics, including proxies for feature importance, for loading into the machine learning pipeline. The data characteristics can be, for example, a summary of the raw data which is placed into the catalogue. The raw data from one or more files in some tabular format with demarcations between items (e.g., comma-separated values (CSV)) is ingested into the computing device. The ingested raw data is scanned several times in which each scan results in some analysis or processing of the raw data. The raw data may be scanned in byte format to increase the processing speed of the parser.

During a type scanning stage, the raw data is scanned to determine a type for each column (e.g., integer, floating-point number, test string, data, etc.) and a total number of rows in the file. Based on that scan, a catalogue is constructed of pre-allocated arrays. The catalogue collects online statistic objects for each column in the raw data, such as prevalence, variance, mean, etc. The construction of the catalogue also includes flags for each column (e.g., the column type and/or subtype) which identify missing cell values, a placeholder for a count of missing values, and the like. The contents of the catalogue may be accessed by index to increase processing speed. Constructing the catalogue with the necessary flags and online statistic objects enables the parser to reserve all necessary memory up front for subsequent processing, thereby avoiding subsequent memory allocation operations.

During a second scan, the raw data is parsed for delimiters only (e.g., commas or other separators between items) to identify the largest gap between any two delimiters, within the raw data. While other scans may identify the delimiters to parse content, the second scan of the raw data is focused solely on the delimiter locations. The parsing may be performed on the bytes of raw data to expedite the processing. A pre-allocated buffer is created in memory based on the largest identified gap (the item with the most characters). That is, a size of the pre-allocated buffer corresponds to the size of the largest identified item so that the buffer can accommodate each item of raw data in the file. In some scenarios, during that second scan the parser performs a label distribution process in which rows of data are assigned as a testing set or a training set. During subsequent processing, rows of data labeled as a training set are submitted to the online model for utilization and rows of testing data are not submitted to the online model.

During a third scan, the raw data is parsed into the constructed catalogue, one item at a time. Each item in the raw data (e.g., items between delimiters) is individually placed, one byte at a time, into the pre-allocated buffer. When the item is complete in the buffer an action is performed on the respective buffer contents. The pre-allocated buffer is reused for each item in the raw data such that additional memory buffer allocations are unnecessary. In typical scenarios, the content associated with the items, when placed into the buffer, is assembled into a number and that number is pushed into an online statistic object within the catalogue.

After parsing each item of the raw data into the catalogue, the populated catalogue with the parsed items may indicate which items exceed a threshold of importance over other items within the catalogue, which indicates proxies of feature importance. The raw data may now be submitted in a tabular data structure for ingestion and processing by the machine learning pipeline, with the catalogue used as a reference to assess which pieces of raw data to load into memory and provide to the model. Utilization of the catalogue in one structure enables fast updating while scanning and can subsequently be changed into a different structure for easier manipulation. While the contents of the catalogue identify proxies for feature importance, the machine learning pipeline may further refine the feature importance for the final predictive model generated.

Implementing the parser early in the machine learning pipeline allows larger data sets to be trained on a single server, and in a distributed context, leads to lower usage of cluster resources and allows more teams to perform more projects at once and at a faster rate. The parser, therefore, amplifies the investment in hardware by increasing scalability and reducing the number of hardware components necessary to process large sets of raw data in the machine learning model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 13-15 show flowcharts of illustrative methods performed by a computing device, server, or the like;

Like reference numerals indicate like elements in the drawings. Elements are not drawn to scale unless otherwise indicated.

DETAILED DESCRIPTION

Figure 1:
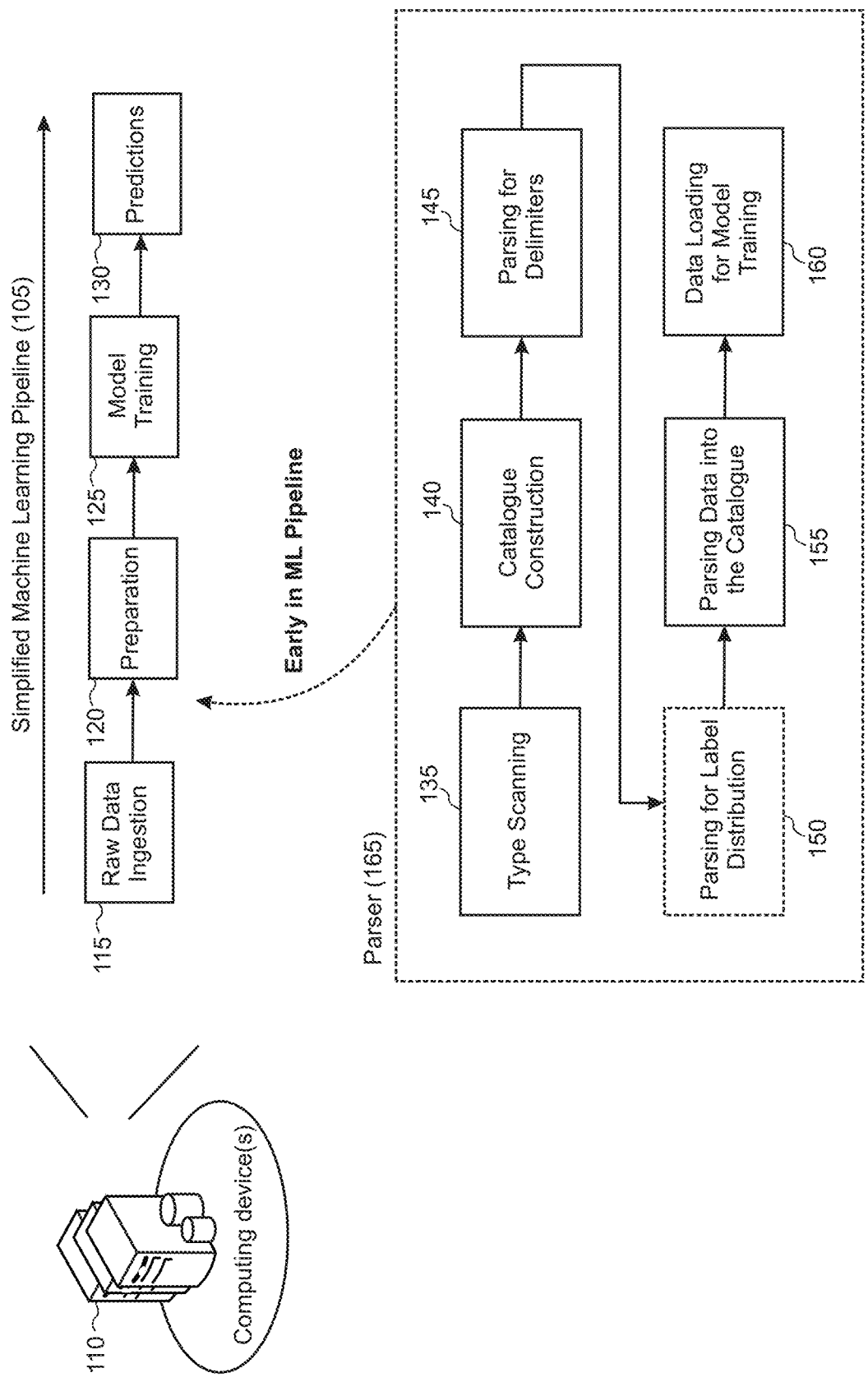
FIG. 1 shows illustrative flowcharts in which the parser is utilized early in the machine learning pipeline.

FIG. 1 shows a simplified machine learning pipeline 105 to which data is ingested and processed by one or more computing devices 110 (e.g., a server) to generate a model for predictive analysis. In simplified form, the machine learning pipeline includes the steps of raw data ingestion 115, preparation 120, model training 125, and predictions 130. Raw data may be ingested in step 115, in which the data may be in some tabular format (e.g., comma-separated values (CSV)). During preparation 120, the data may be prepared for use in machine learning training. The data may be randomized, to reduce the possibility of an order affecting the machine learning process, and separated, between a training set for training the model and a testing set for testing the trained model. Other forms of data manipulation may be performed as well, such as normalization, error correction, and the like.

The prepared data may then be used for model training in step 125. The model training may be used to incrementally improve the model's ability to make accurate predictions. The model training may use the features contained in the data to form a matrix with weights and biases against the data. Random values within the data may be utilized to attempt prediction of the output based on those values. This process may repeat until a more accurate model is developed which can predict correct outputs. The model may subsequently be evaluated to determine if it meets some accuracy threshold (e.g., 70% or 80% accuracy), and then predictions will be performed at step 130. In this step, a question can be posed to the computing device 110 on which the model operates, and the computing device can provide an answer using the developed model.

The parser 165 may be utilized early in the machine learning pipeline 105 to identify and load data with information proxies for feature importance to the pipeline to expedite the processing and reduce the amount of memory utilized when processing the data set. The proxy for feature importance may be data that surpasses some threshold of importance relative to other items. As discussed in greater detail below, the parser includes several stages which include type scanning 135, catalogue construction 140, parsing for delimiters 145, parsing for label distribution 150, parsing data into the catalogue 155, and data loading for model training 160. The parsing for label distribution stage 150 is optional and may or may not be implemented depending on the configuration.

Figure 2:
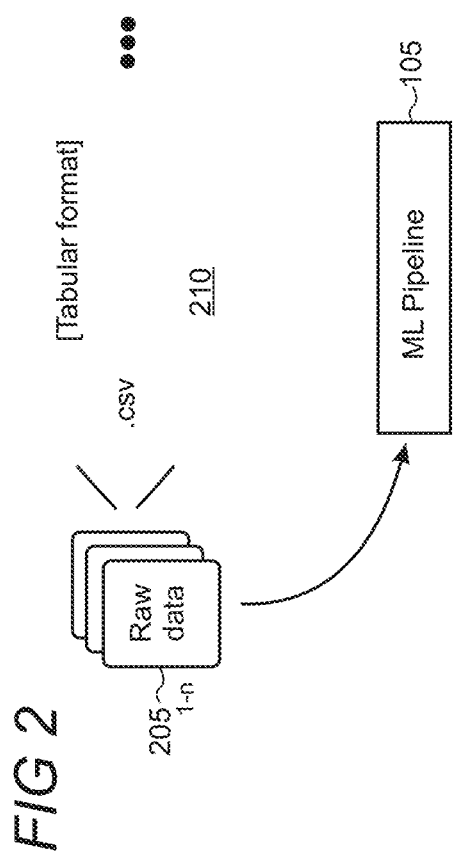
FIG. 2 shows an illustrative diagram in which the raw data is in some tabular format.

FIG. 2 shows an illustrative diagram in which the raw data files 205 ingested into the machine learning pipeline may be in some tabular format in which the demarcation between items is documented. The tabular format may, for example, correlate to a table having rows and columns with cells which represent the content. An exemplary tabular format can include CSV (comma-separated values) as illustratively shown by numeral 210.

Figure 3:
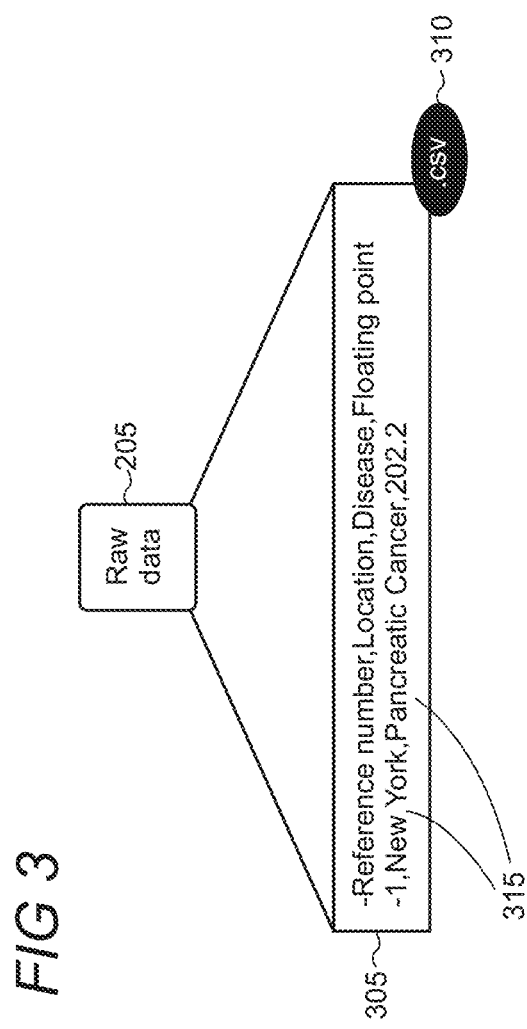
FIG. 3 shows an illustrative diagram in which the raw data is separated by delimiters.

FIG. 3 shows an example of the raw data 205 for a file 305 in .csv format 310. The delimiter in a .csv file is a comma which separates items 315 of content from each other. The items may include, for example, the content of the data types under which the content is located.

Figure 4:
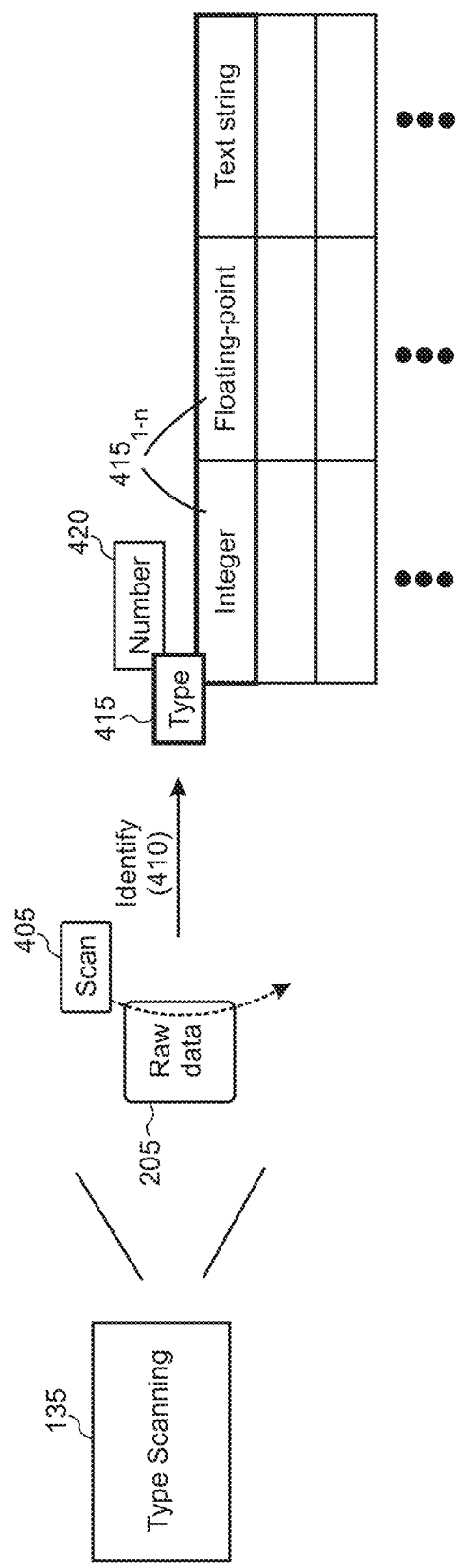
FIG. 4 shows an illustrative diagram in which the raw data is scanned to identify type and number of columns.

FIG. 4 shows an illustrative diagram in which the raw data file 205 is scanned during the type scanning stage 135. Several scans are performed on the raw data file by the parser 165 (FIG. 1), in which each scan results in some processing of the data. The scan 405 performed during type scanning may be the first scan on the raw data file in the process, during which the parser identifies (410) a type 415 of each column in the raw data and a total number 420 of rows within the raw data. The type 415 of each column can include whether the content within the columns is an integer, a floating-point number, a text string (e.g., "New York"), data (e.g., a recognizable date format which the parser can convert into an appropriate numerical value), and the like. The identified types and number are stored in an array. The table having columns and rows in FIG. 4 is an example structure of demarcated raw data.

Figure 5:
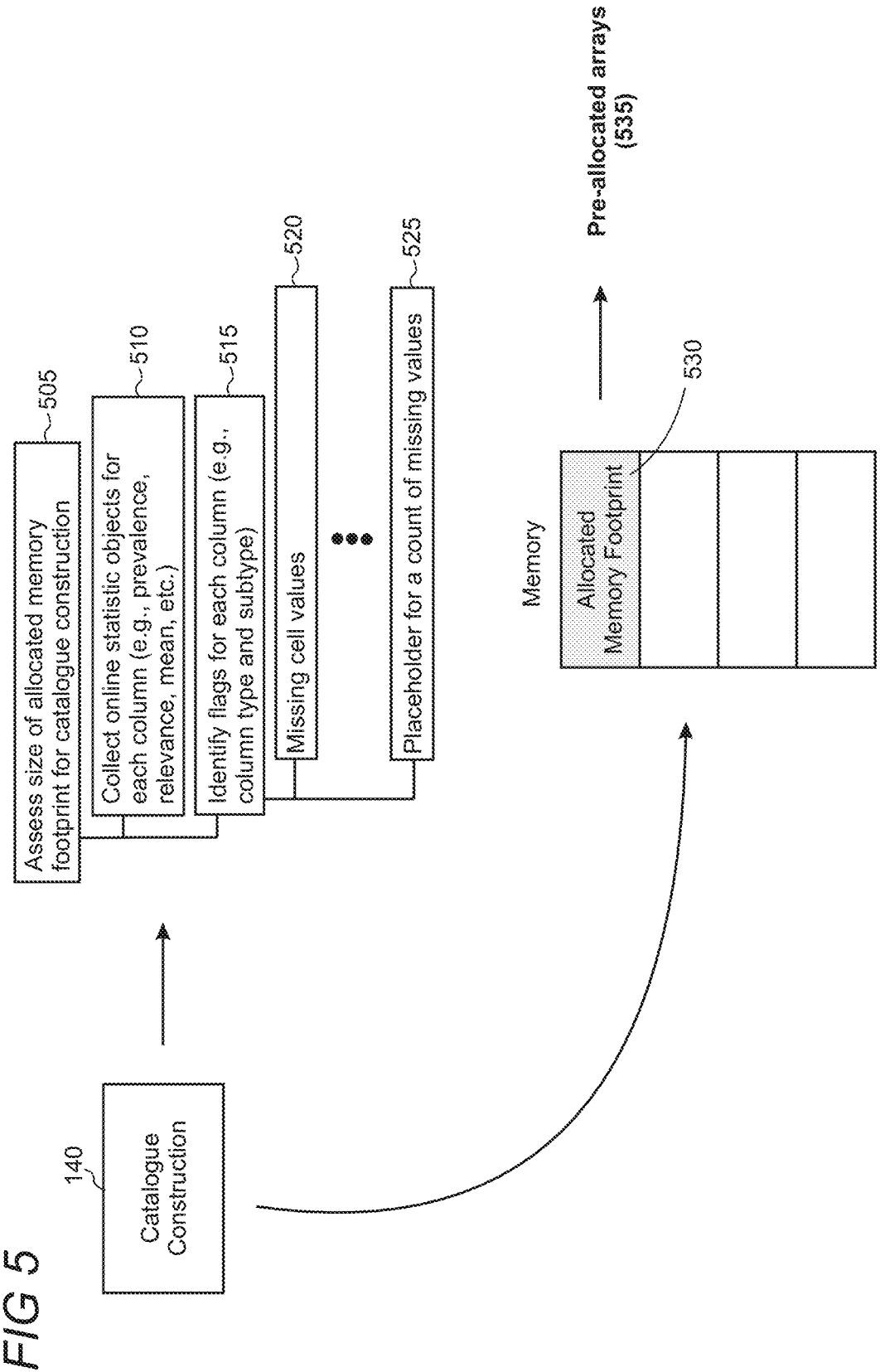
FIG. 5 shows an illustrative diagram in which a catalogue is constructed with an allocated memory footprint.

FIG. 5 shows an illustrative diagram of the operations during the catalogue construction stage 140. The catalogue is constructed based on the information that the parser 165 obtains from the scan 405 (FIG. 4). The construction of the catalogue creates an allocated memory footprint 530 made of pre-allocated arrays 535 so that the amount of memory utilized and allocated by the parser is set. That is, the memory footprint is the maximum amount of memory utilized during parsing of the raw data and therefore additional memory allocation operations are unnecessary. Minimizing memory allocations can lead to exponential performance increases when processing the data.

As illustratively represented by numeral 505, the parser assesses a size of the allocated memory footprint for catalogue construction. This assessment is performed by collecting online statistic objects for each column (e.g., prevalence, variance, mean, etc.) 510 and identifying flags for each column 515 (e.g., column type and subtype). The flags may include missing cell values 520 and a placeholder for a count of missing values 525, among other flags. For example, negative signs for negative numbers and decimal points for floating point numbers can be flagged as well, in which the flag can be used to modify the processed cell.

Performing this pre-processing of the data enables the parser to reserve a stable amount of memory in which all subsequent operations can take place. The online statistic objects and flags may be stored in respective pre-allocated arrays. Online statistic objects for each column can accept data from a respective column's population in any order and at different times, and then produce statistics that reflect the whole population. The catalogue contents may be accessed by index to increase processing speed.

The online statistic objects can be calculated in "streaming" fashion, that is, without necessarily requiring all the data in the same place at the same time and without storing the raw data. Online statistics can be collected on pieces of the raw data at different times or on different computers and can be merged together to determine the whole population. Because online statistics do not store the raw data points, implementations in computer programs have consistent, constant, and predictable resource usage and processing times.

Multiple catalogues can be merged together as long as the raw data is structured in the same way (i.e., has the same columns). Statistics can be collected from different portions of the data set hosted on different machines, or on data that arrives subsequently in time. This facility enables the parser 165 to be used in parallel contexts, on distributed systems, or for federated analytics.

Figure 6:
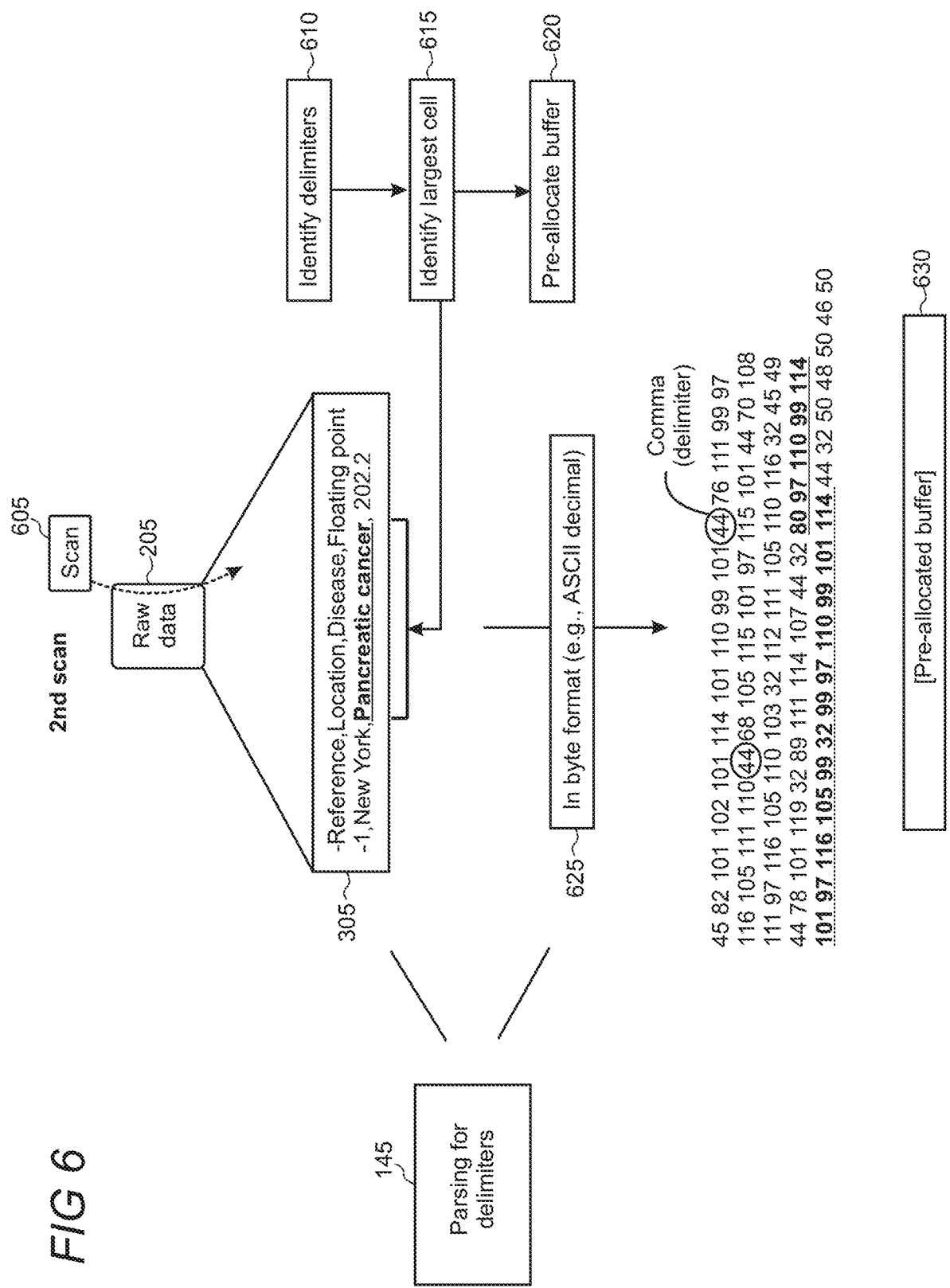
FIG. 6 shows an illustrative diagram in which the raw data is parsed for delimiters.

FIG. 6 shows an illustrative diagram in which a second scan 605 is performed on the raw data 205 to parse for delimiters 145. The scan is performed on the data in byte format to expedite processing of the data, as illustratively shown by numeral 625. During this stage, the parser 165 identifies delimiters in step 610. Delimiters can include some demarcation (e.g., commas) between items of data. In step 615, the parser identifies a largest cell (i.e., item of data between delimiters) within the raw data. In step 620, the parser pre-allocates a buffer based on the size of the largest identified cell of data.

The pre-allocated buffer 630 is utilized during subsequent processing to hold, process, and assemble the raw data contents (e.g., parts of the item) into the catalogue. No additional memory allocation operations are necessary beyond this parsing stage since a size of the buffer is pre-allocated because the largest possible cell has been identified. The pre-allocated array is repeatedly overwritten with data during subsequent processing, rather than being de-allocated and re-allocated. This configuration facilitates the high-speed processing of a small and constant memory footprint of the parser and minimizes calls to the garbage collector if such is used by the implementation language. An example of the data in byte format (ASCII decimal) is shown, in which the commas (delimiters) are represented by the number 44 and the largest cell of data is emphasized in bold and underline.

Figure 7:
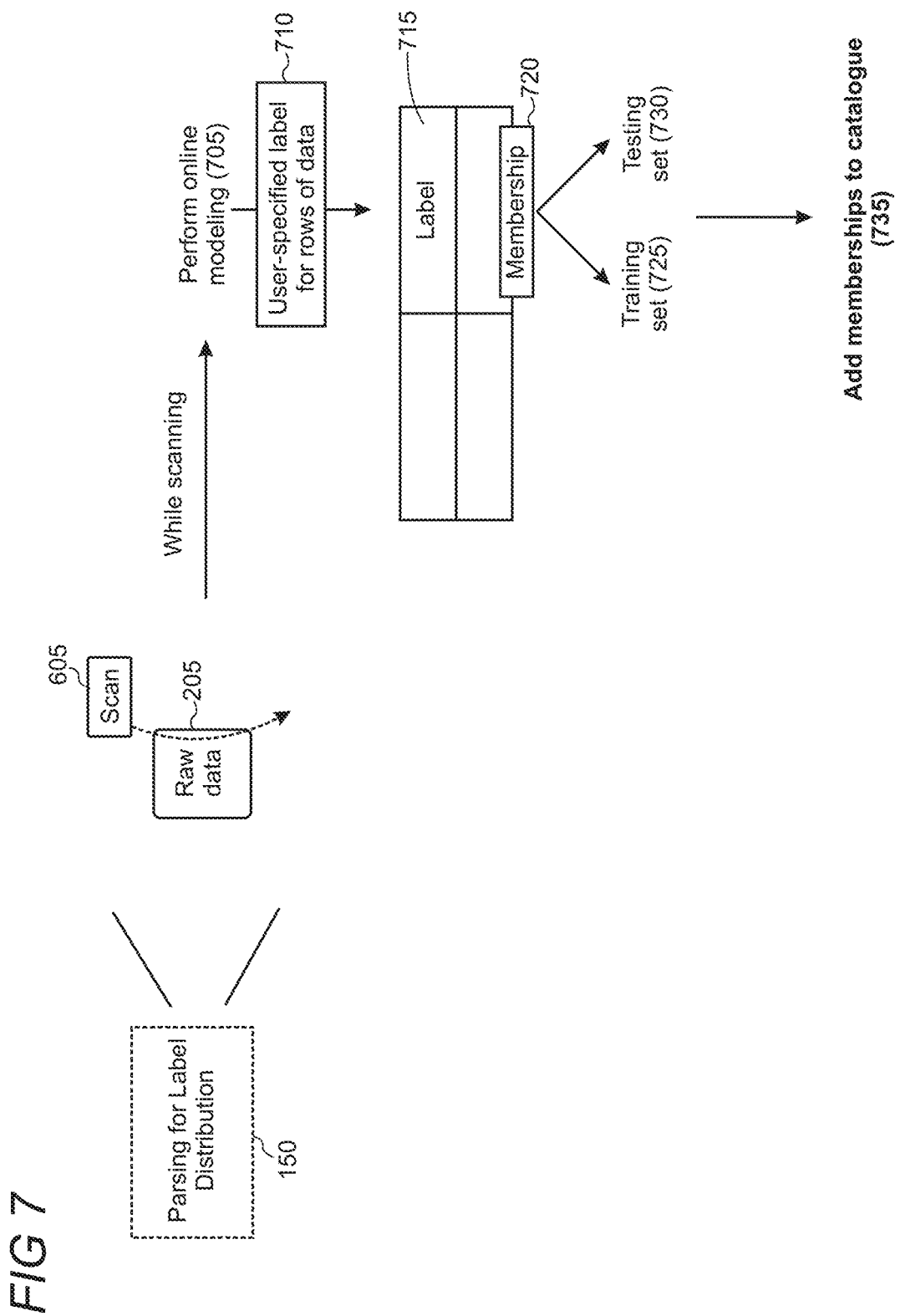
FIG. 7 shows an illustrative environment in which the raw data is parsed for label distribution into training or testing sets.

FIG. 7 shows an illustrative diagram of an optional step in which the raw data is parsed for label distribution, as illustratively shown by numeral 150. During the second scan of the raw data, the parser performs online modeling 705 in which the parser adds a label column 715 to the catalogue and uses a user-specified label for the rows of data 710. That is, the user may specify the labels and then the parser acts on this specification. A zeroed array is pre-allocated to hold the membership labels and may be the same size as the data set. This increases the size of the memory allocated for the overall operation (i.e., the memory footprint for the catalogue) but only by a single column of raw data.

Each row may be identified by membership 720 as a training set 725 or a testing set 730. Training set data is used to train the model and testing set data is used to measure how well the created model performs at making predictions. Upon identifying whether the column is a training or testing data set, the memberships for each row are added to the catalogue 735. With this optional step, the previously allocated memory footprint 530 (FIG. 5) and pre-allocated buffer 630 (FIG. 6) may increase, but the size may still not subsequently change during scanning and would thereby still be stable.

There is a class of algorithms in machine learning, called "online models", that may not require all of the training set data to be in memory at the same time, with the caveat that the generated model may suffer from lesser accuracy than standard predictive models. There may be one of two optional steps that are performed. In one optional step, the parser extracts proxies for feature importance from the ingested raw data. In the other optional step, an online model is used for actual feature importance. For either option the proxies or feature importance are still different from (though closely related to) the final feature importance from the final model which is created during the later stages of the machine learning pipeline (i.e., the machine learning pipeline 105 from FIG. 1).

The machine learning pipeline 105 typically expects the raw data to be split into training and testing sets. To prevent risk of polluting the training set and thereby the quality of the final predictive model, rows in the testing set cannot be utilized in the online model. Therefore, if an online model is to be used, rows of data are assigned training or testing labels during scanning to ensure equal sizes of membership among the two.

To achieve this end, the parsing for label distribution step 150 is optionally utilized when online modeling is desired. This step determines the distribution of membership of the raw data. In typical implementations, a config. file is written in a standard text editor, but in other embodiments a user interface could be configured to enable a user to specify the column location of the membership labels and the contents of the label column read into a label array instead of the catalogue. The online model object manages its own memory allocation by pre-allocating the model beforehand, so the memory footprint of the online model object is stable with a relatively minor increase in the catalogue's size.

Figure 8:
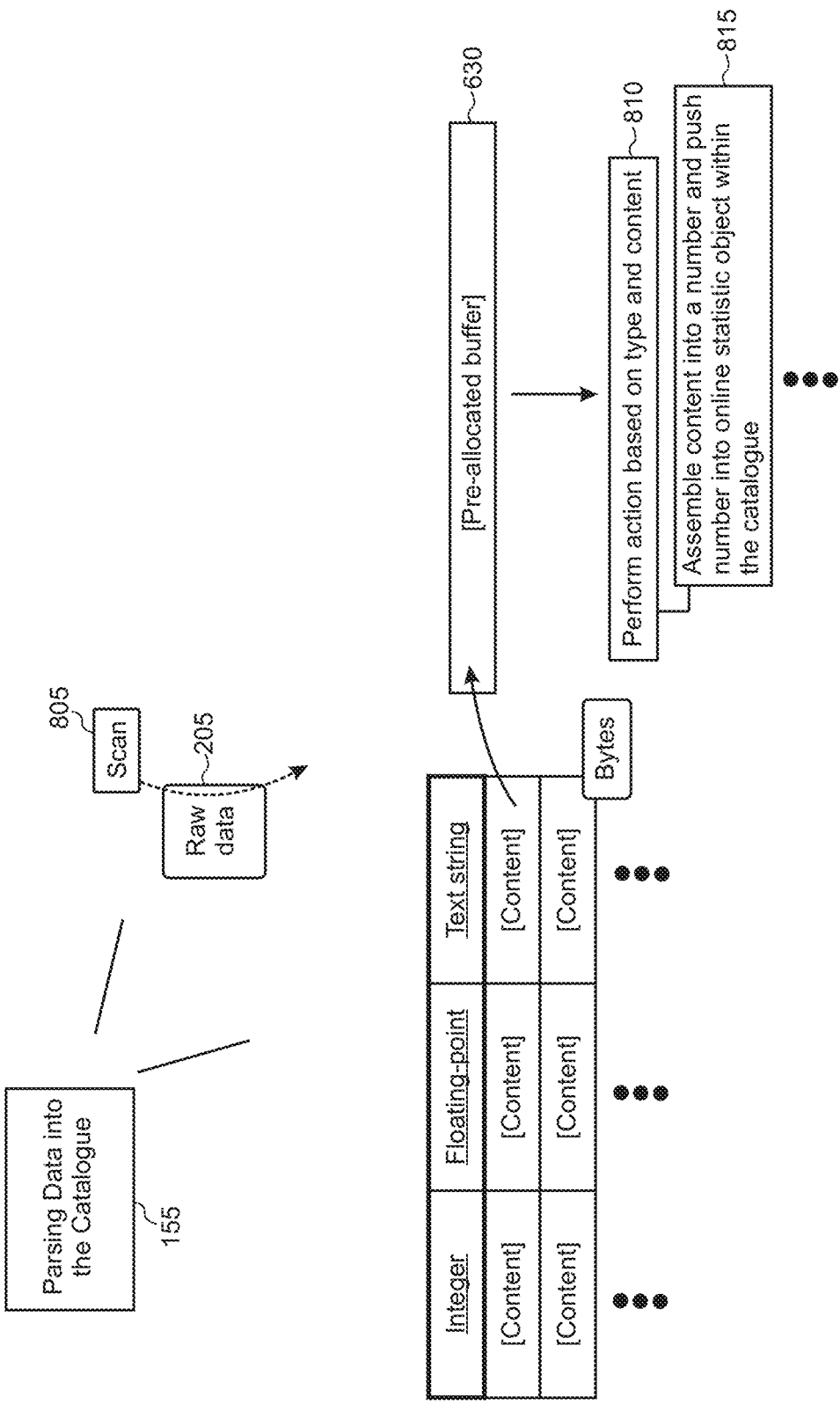
FIG. 8 shows an illustrative diagram in which the raw data is placed into a pre-allocated buffer and parsed into the catalogue.

FIG. 8 shows an illustrative diagram in which the data is parsed into the catalogue 155. The parser scans 805 over the file byte-by-byte and each item of content within the columns is individually transferred to the pre-allocated buffer 630 for processing. The parser performs an action based on the type of column under which a respective cell lies (e.g., integer, floating-point, text string, data) and the content of the cell 810. In typical scenarios, the parser assembles the content (e.g., an item or parts of an item) into a number and pushes that number into an online statistic object within the catalogue 815, but other actions are also possible.

In scenarios in which parsing for label distribution is performed, the row contents may be submitted to an online model depending on the row's membership (i.e., training or testing set). This enables consistent usage of the rows of data when the catalogue is fed into the machine learning pipeline. The parser for this optional step operates similarly to the parsing of the content shown in FIG. 8 but skips all of the columns apart from the label column and copies the content in the pre-allocated buffer into the label array instead of the catalogue.

Figure 9:
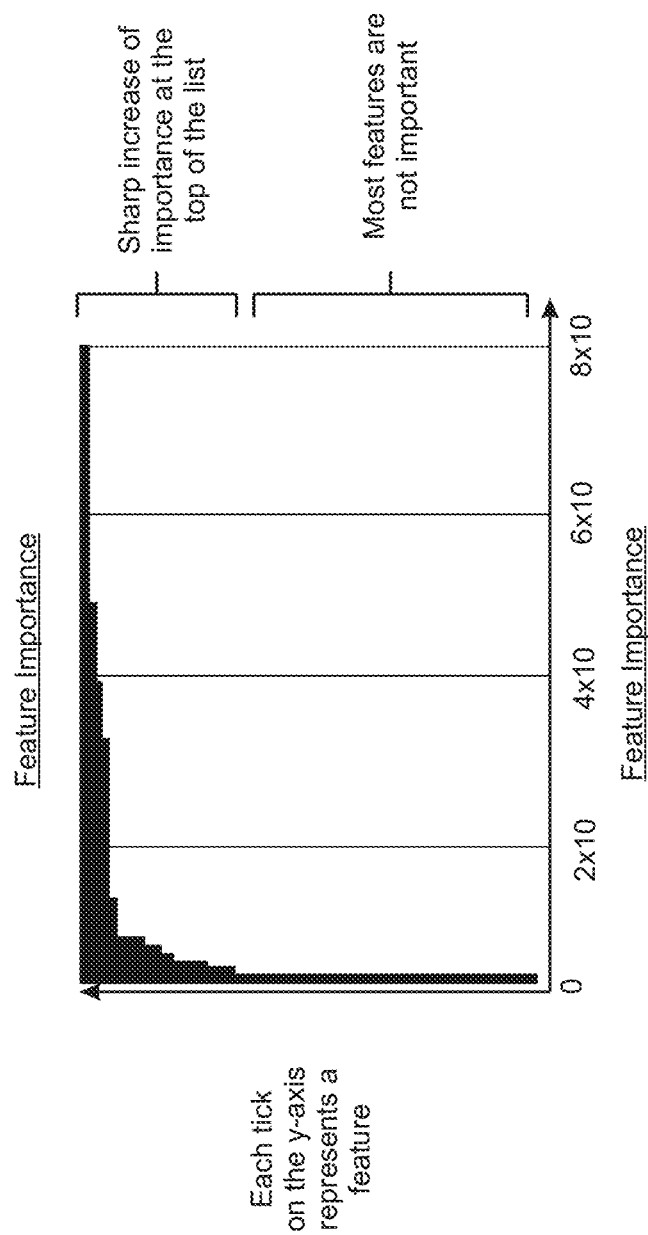
FIG. 9 shows an illustrative graph in which a proxy for feature importance of the raw data is indicated by the parsing process, which is passed on to the machine learning model for utilization.

A proxy for the feature importance of the raw data within the catalogue can be assessed after parsing through each item of data. For example, columns having an online statistic result with a relatively high number can be more relevant than columns having an online statistic result with a relatively lower number. FIG. 9 shows an illustrative graph in which portions of data exhibit greater feature importance than other portions of data. There is a sharp increase in importance at the top of the list, but most features may not be important to the machine learning modeling. Typically, the feature importance reveals how important each column (e.g., a predictor) is in influencing the outcome of a question. The parser enables the identification of proxies for feature importance to feed into the machine learning pipeline to discard unimportant features. This can increase the overall processing speed of the machine learning pipeline to generate a model of equal quality or, in some scenarios, increased quality by eradicating noisy or irrelevant features which can negatively affect the learning process. While the parser identifies a proxy for feature importance, the machine learning pipeline may further refine the feature importance for the final predictive model generated, so the final feature importance may not be the same as the data shown in FIG. 9.

Figures 10, 11:
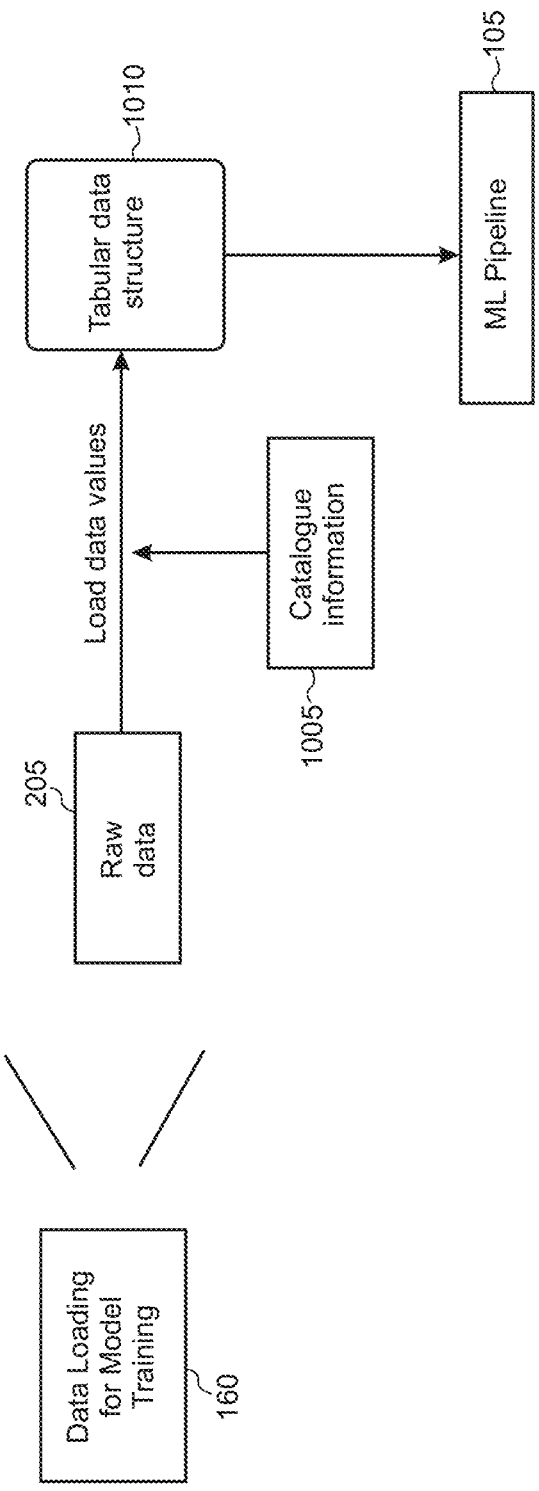
FIG. 10 shows an illustrative diagram in which the data in the catalogue is loaded into the machine learning pipeline.
FIG. 11 shows an illustrative table which is used to look up bytes within the raw data.

FIG. 10 shows an illustrative diagram in which the parsed information is used as a reference to load the raw data into the model for training (e.g., into the machine learning pipeline 105) in step 160. The raw data 205 may be loaded as a tabular data structure 1010 into the machine learning pipeline 105, in which the data loaded may use the catalogue information 1005 as a reference to determine which pieces of the raw data to load into the pipeline or disregard. The information from the catalogue can be used to pre-allocate a zeroed optimal tabular data structure in memory, for speed and to ensure there is sufficient free memory to fit the required raw data. Then the raw data from the disk is scanned over and, this time, loaded into the zeroed optimal tabular data structure instead of the catalogue. The machine learning pipeline 105 then proceeds as normal.

In contrast to a standard approach in which all of the data may be loaded, utilization of the catalogue enables the parser to skip over unnecessary data, thus reducing the needed size of the tabular data structure, insert numerical data directly into the data structure without employing a conversion step, and utilize a table to look up string values to reference the mapping from the catalogue, as shown in FIG. 11, so that only codes for string values are loaded directly into the tabular data structure. For example, the meaning of a byte in the raw data can be determined using a table to look up a corresponding code for the byte. Columns with bytes representing categories with strings can be translated into a number to identify that string, such as "1" for NY, "2" for NJ, "3" for CT, and so on. The number is inserted directly into the tabular data structure without needing to load the string.

While numerical data can be processed directly into the data structure without conversion, negative data values are processed using associated flags. For example, a flag is set within the catalogue if a byte that corresponds to a negative sign is identified. In some scenarios, the negative sign is not loaded into the buffer to save processing time, but rather an additional operation on the cell's value may be performed, such as subtracting the cell's value from zero to effectively make the cell a negative number.

An additional variable is stored to identify a location of a decimal point inside a cell when the decimal point is detected in byte form. Similarly to the handling of the negative sign for numbers, in order to save time, the decimal point byte may not be loaded into memory, but rather the presence of the decimal point switches a flag which modifies the place value operation of the cell after the processing of the number.

Figure 12:
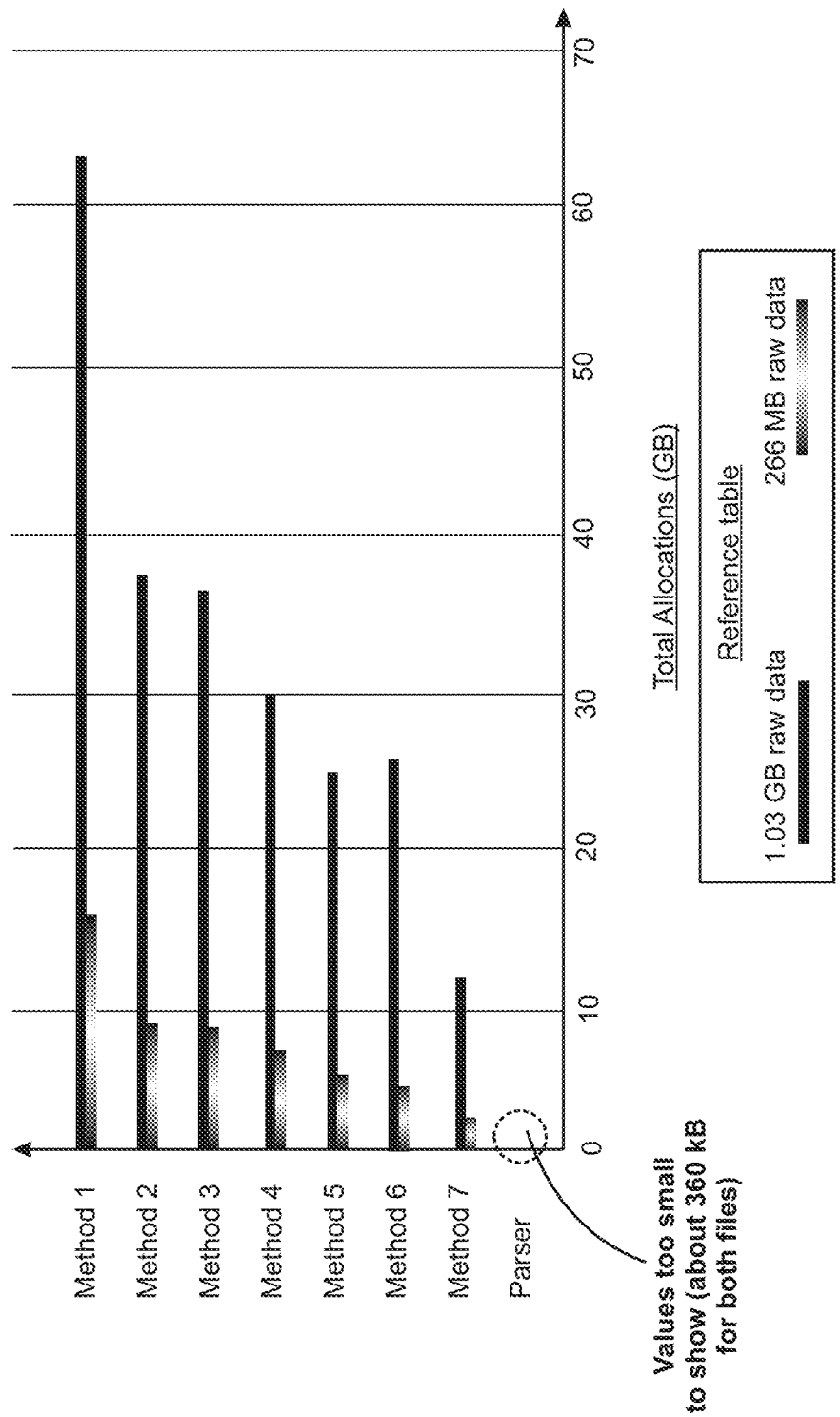
FIG. 12 shows a graph in which the parser utilizes a lower memory footprint than other methods of processing the data.

FIG. 12 shows a graph which illustrates the benefits provided by the parser 165 disclosed herein. Two experiments were performed in which data were loaded into memory from CSV files using various methods (a proxy for feature importance was not assessed), in which one experiment comprised 1.03 gigabytes (GB) of raw data and the other experiment comprised 266 megabytes (MB) of raw data. Several of the methods allocated relatively large amounts of data as shown in the graph, whereas the present parser allocated approximately 360 kilobytes (kB) of data for both experimental files. As shown, the magnitude of the benefit realized by the disclosed parser is more than ten times more efficient in terms of memory allocation relative to the most efficient open source method used in this experiment (Method 7). The methods used for comparison listed in FIG. 12 are:

Method 1: Julia standard library each line function, iterating by row with a JSON parser Method 2: Julia standard library each line function, iterating by row, with a standard library parser Method 3: TextParse.jl, iterating by row Method 4: CSV.jl File handler, iterating by whole file Method 5: TextParse.jl, iterating by whole file Method 6: Julia standard library eachline function, iterating by characters within row with a JSON parser Method 7: CSV.jl File handler, iterating by row In some scenarios, the parser operates in parallel, but it can also run in a single-threaded fashion depending on the capabilities of the computing device. The parser can also work in a parallel fashion, expanding to the number of cores on the machine.

Parallelism is made possible, in part, due to the small memory footprint utilized. A parallel operation usually involves reserving areas of memory for each thread. The parser 165 scales well because the size of the footprint multiplied by the number of threads fall below the maximum system memory available. Various parallelism options are available with the parser 165.

A simplified parallelism process uses parallelism across files. Where the raw data is already split into multiple files, one parser can be run per file using its own catalogue, and the catalogues can then be merged when the parsing is complete. This allows, for example, in 8-thread operation, for eight files to be scanned in the same length of time as one file (depending on how the disk is accessed).

Parallelizing within a file is a method in which data parallelism is performed by skipping rows. Each thread is given its own parser and catalogue, a starting row number and an ending row number. The parser reads through the byte stream, skipping all content until the ending row number indicating the required number of rows is passed, then starts reading the data into the buffer as normal. When the file has been scanned, the catalogues from each thread are merged into one.

Parallelism can occur across machines. In one example, to parallelize using multiple machines is to have the data split across the machines, prepare catalogues for each, and, once parsed, bring the catalogues to a single machine and merge them. The size of each catalogue may be trivial and quick to transfer across a network, since the catalogue only includes summary information and does not contain raw data.

Figure 13:
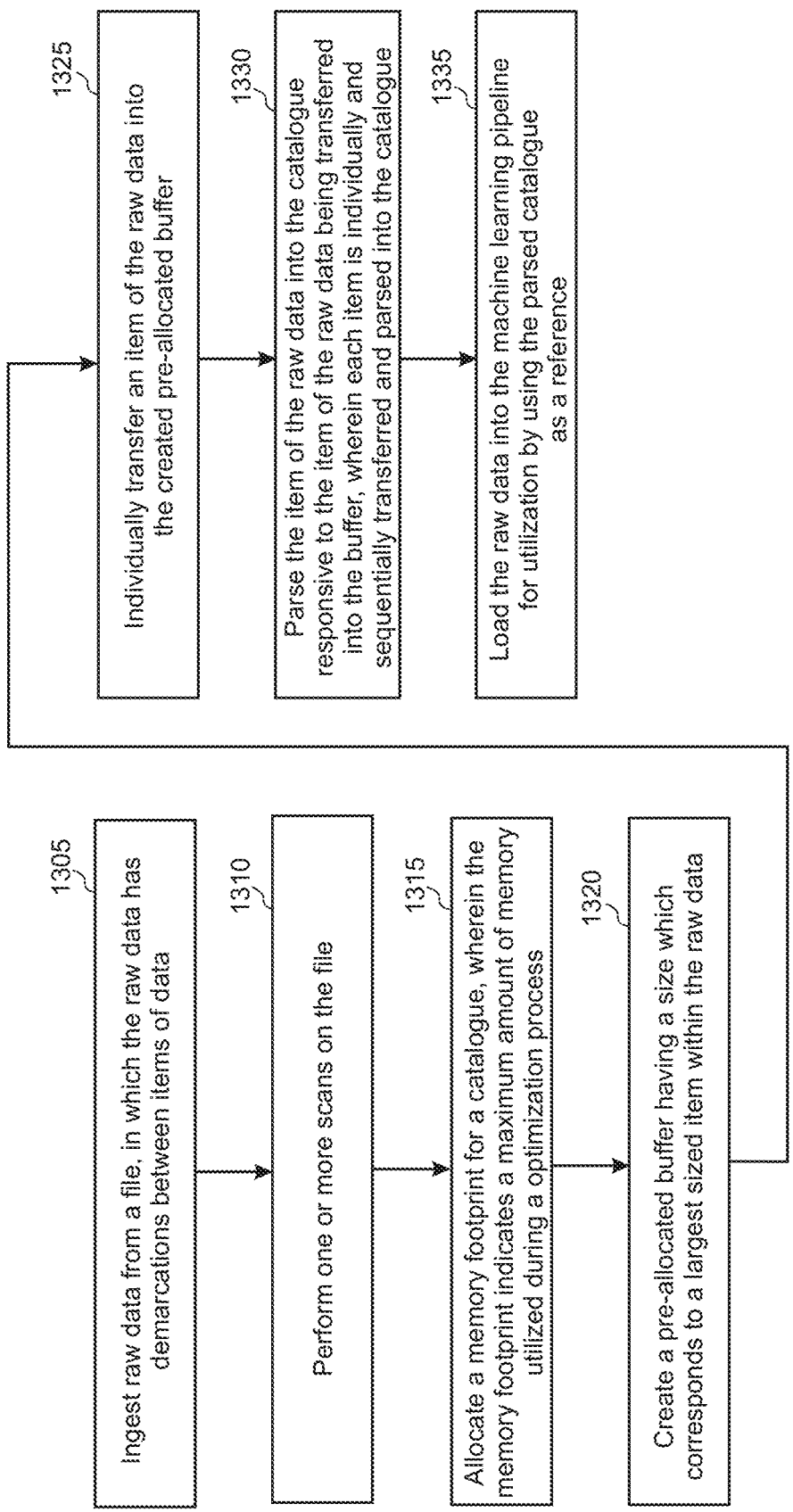

FIG. 13 shows a flowchart of an illustrative method 1300 which may be implemented on a server or other computing device. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, the computing device ingests raw data from a file, in which the raw data has demarcations between items of data. In step 1310, the computing device performs one or more scans on the file, in which one or more processes on the data is performed during the respective scans. In step 1315, the computing device allocates a memory footprint for a catalogue, wherein the memory footprint indicates a maximum amount of memory utilized during a machine learning optimization process. In step 1320, the computing device creates a pre-allocated buffer having a size which corresponds to a largest sized item within the raw data. In step 1325, the computing device individually transfers an item of the raw data into the created pre-allocated buffer. In step 1330, the computing device parses the item of the raw data into the catalogue responsive to the item of the raw data being transferred into the pre-allocated buffer. Each item is individually and sequentially transferred into the pre-allocated buffer and then parsed into the catalogue. In step 1335, the computing device loads the raw data into the machine learning pipeline for utilization by using the parsed catalogue as a reference.

Figure 14:
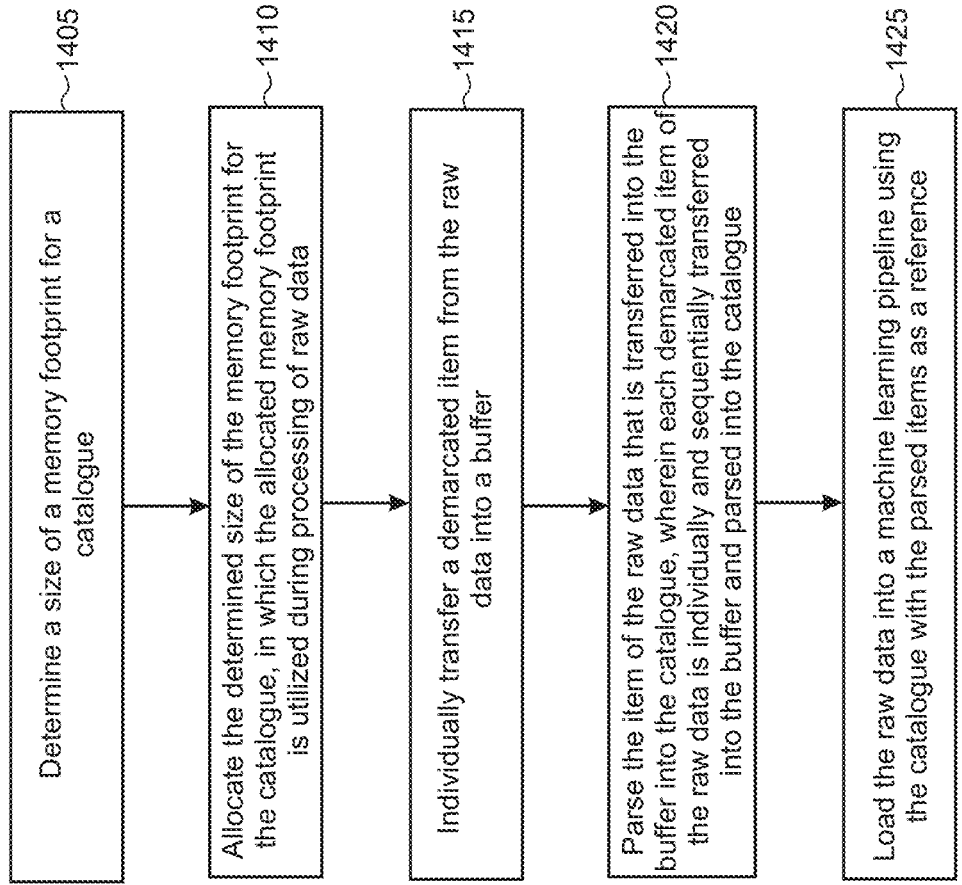

FIG. 14 shows a flowchart of an illustrative method 1400 which may be performed by a computing device or server. In step 1405, the computing device determines a size of a memory footprint for a catalogue. In step 1410, the computing device allocates the determined size of the memory footprint for the catalogue, in which the allocated memory footprint is utilized during processing of raw data. In step 1415, the computing device individually transfers a demarcated item from the raw data into a buffer. In step 1420, the computing device parses the item of the raw data that is transferred into the buffer into the catalogue. Each demarcated item of the raw data is individually and sequentially transferred into the buffer and parsed into the catalogue. In step 1425, the computing device loads the raw data into a machine learning pipeline using the catalogue with the parsed items as a reference.

Figure 15:
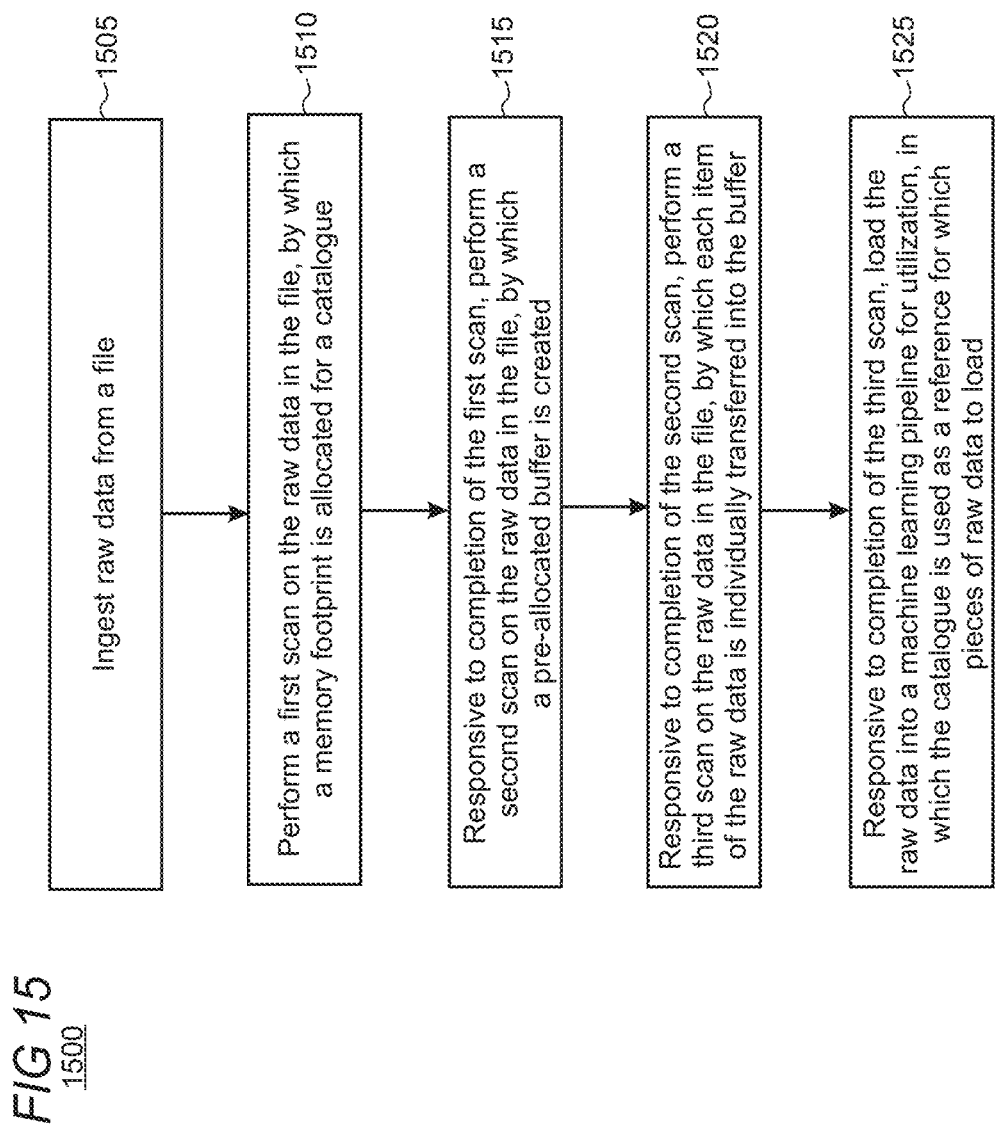

FIG. 15 shows a flowchart of an illustrative method 1500 which may be performed by a computing device or some remote service. In step 1505, the computing device ingests raw data from a file. In step 1510, the computing device performs a first scan on the raw data in the file, by which a memory footprint is allocated for a catalogue. In step 1515, responsive to completion of the first scan, the computing device performs a second scan on the raw data in the file, by which a pre-allocated buffer is created. In step 1520, responsive to completion of the second scan, the computing device performs a third scan on the raw data in the file, by which each item of the raw data is individually transferred into the pre-allocated buffer. In step 1525, responsive to completion of the third scan, the computing device loads the raw data using summary information about the parsed items into a machine learning pipeline for utilization, in which the catalogue is used as a reference for which pieces of raw data to load.

Figure 16:
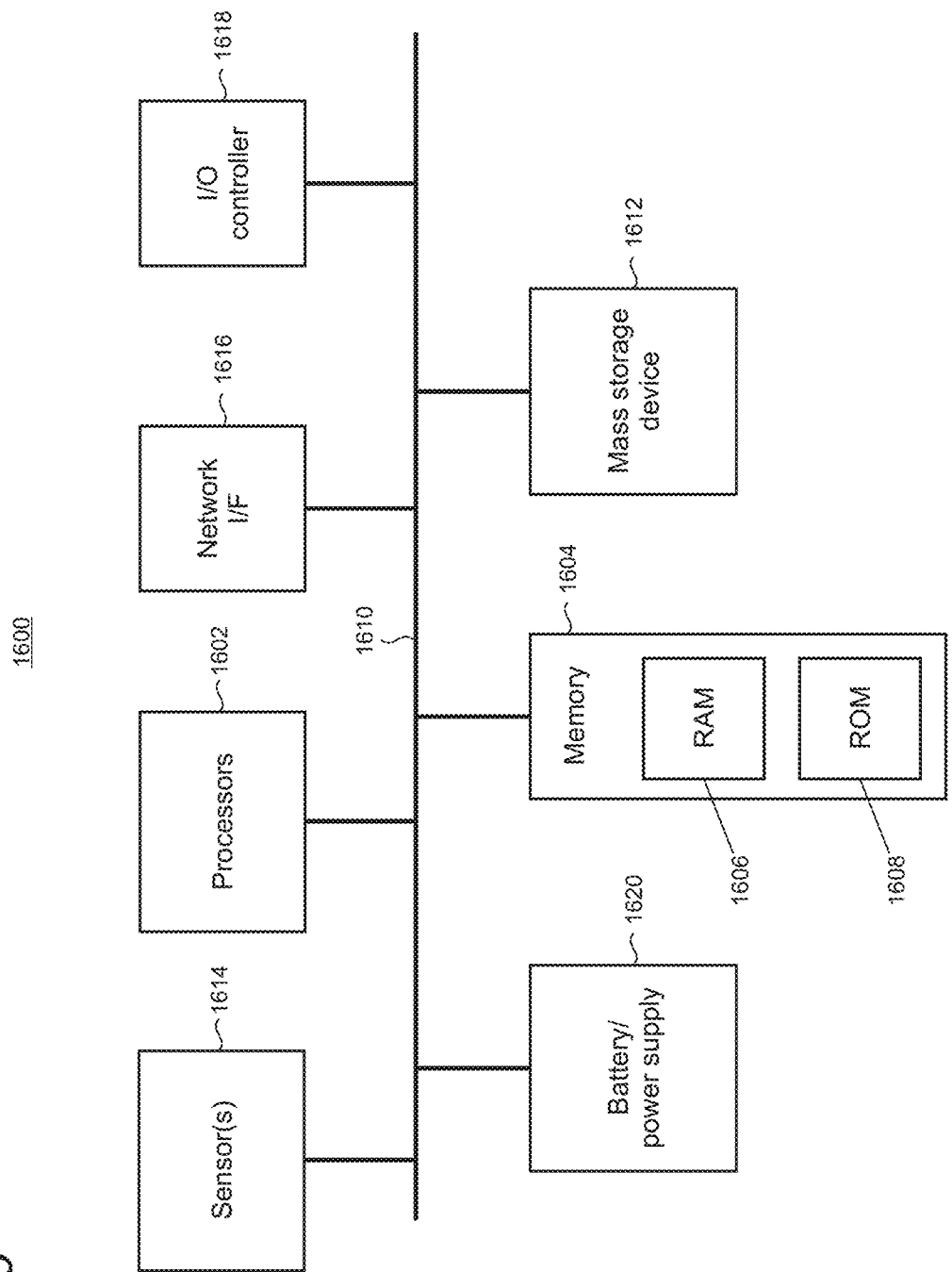
FIG. 16 is a simplified block diagram of an architecture of an illustrative computing device that may be used at least in part to implement the present high-speed scanning parser for scalable collection of statistics and use in preparing data for machine learning.

FIG. 16 shows an illustrative architecture 1600 for a computing device such as a laptop computer or personal computer for the present high-speed scanning parser for scalable collection of statistics and use in preparing data for machine learning. The architecture 1600 illustrated in FIG. 16 includes one or more processors 1602 (e.g., central processing unit, dedicated Artificial Intelligence chip, graphics processing unit, etc.), a system memory 1604, including RAM (random access memory) 1606 and ROM (read only memory) 1608, and a system bus 1610 that operatively and functionally couples the components in the architecture 1600. A basic input/output system containing the basic routines that help to transfer information between elements within the architecture 1600, such as during startup, is typically stored in the ROM 1608. The architecture 1600 further includes a mass storage device 1612 for storing software code or other computer-executed code that is utilized to implement applications, the file system, and the operating system. The mass storage device 1612 is connected to the processor 1602 through a mass storage controller (not shown) connected to the bus 1610. The mass storage device 1612 and its associated computer-readable storage media provide non-volatile storage for the architecture 1600. Although the description of computer-readable storage media contained herein refers to a mass storage device, such as a hard disk or CD-ROM drive, it may be appreciated by those skilled in the art that computer-readable storage media can be any available storage media that can be accessed by the architecture 1600.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray, or other optical storage, magnetic cassette, magnetic tape, magnetic disk storage or other magnetic storage device, or any other medium which can be used to store the desired information and which can be accessed by the architecture 1600.

According to various embodiments, the architecture 1600 may operate in a networked environment using logical connections to remote computers through a network. The architecture 1600 may connect to the network through a network interface unit 1616 connected to the bus 1610. It may be appreciated that the network interface unit 1616 also may be utilized to connect to other types of networks and remote computer systems. The architecture 1600 also may include an input/output controller 1618 for receiving and processing input from a number of other devices, including a keyboard, mouse, touchpad, touchscreen, control devices such as buttons and switches or electronic stylus (not shown in FIG. 16). Similarly, the input/output controller 1618 may provide output to a display screen, user interface, a printer, or other type of output device (also not shown in FIG. 16).

It may be appreciated that the software components described herein may, when loaded into the processor 1602 and executed, transform the processor 1602 and the overall architecture 1600 from a general-purpose computing system into a special-purpose computing system customized to facilitate the functionality presented herein. The processor 1602 may be constructed from any number of transistors or other discrete circuit elements, which may individually or collectively assume any number of states. More specifically, the processor 1602 may operate as a finite-state machine, in response to executable instructions contained within the software modules disclosed herein. These computer-executable instructions may transform the processor 1602 by specifying how the processor 1602 transitions between states, thereby transforming the transistors or other discrete hardware elements constituting the processor 1602.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1600 may further include one or more sensors 1614 or a battery or power supply 1620. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1600 in order to store and execute the software components presented herein. It also may be appreciated that the architecture 1600 may include other types of computing devices, including wearable devices, handheld computers, embedded computer systems, smartphones, PDAs, and other types of computing devices known to those skilled in the art. It is also contemplated that the architecture 1600 may not include all of the components shown in FIG. 16, may include other components that are not explicitly shown in FIG. 16, or may utilize an architecture completely different from that shown in FIG. 16.

Figure 17:
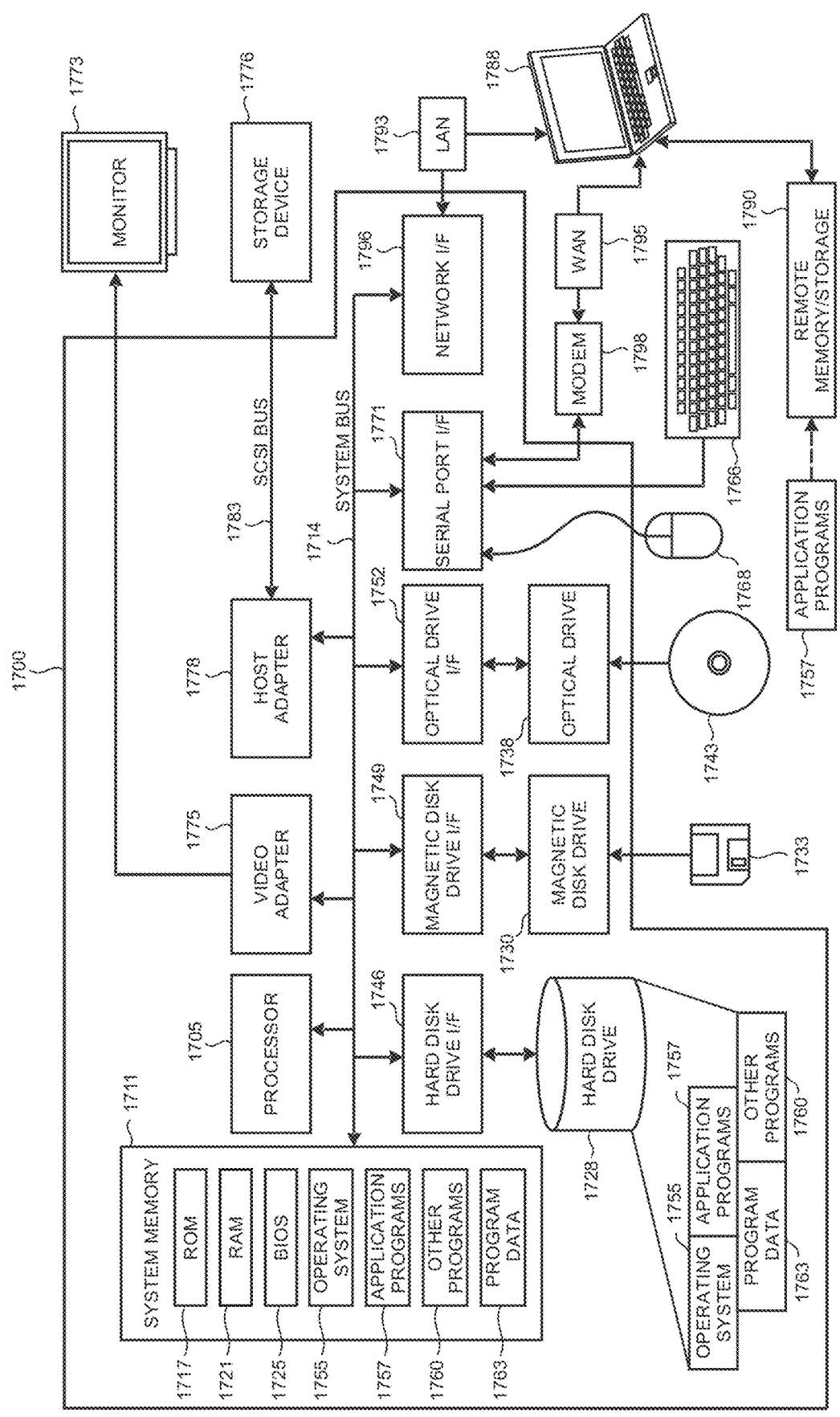
FIG. 17 is a simplified block diagram of an illustrative computing device, remote service, or computer system that may be used in part to implement the present high-speed scanning parser for scalable collection of statistics and use in preparing data for machine learning.

FIG. 17 is a simplified block diagram of an illustrative computer system 1700 such as a PC or server with which the present high-speed scanning parser for scalable collection of statistics and use in preparing data for machine learning may be implemented. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present high-speed scanning parser for scalable collection of statistics and use in preparing data for machine learning. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1733, optical disk 1743, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, personal computers typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as another personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present high-speed scanning parser for scalable collection of statistics and use in preparing data for machine learning.

Various exemplary embodiments of the present high-speed scanning parser for scalable collection of statistics and use in preparing data for machine learning are now presented by way of illustration and not as an exhaustive list of all embodiments. An example includes a method performed by a computing device for optimization of a machine learning pipeline, comprising: ingesting raw data from a file, in which the raw data has demarcations between items of data; performing one or more scans on the file, in which the one or more scans are used to: allocate a memory footprint for a catalogue, wherein the memory footprint indicates a maximum amount of memory utilized during the machine learning pipeline optimization process to avoid performance of additional memory allocation operations during subsequent processing, create a pre-allocated buffer having a size which corresponds to a largest sized item within the raw data, individually transfer an item of the raw data into the created pre-allocated buffer, and parse the transferred item of the raw data into the catalogue responsive to the item of the raw data being transferred into the pre-allocated buffer, wherein each item of the raw data is individually and sequentially transferred into the pre-allocated buffer and parsed into the catalogue; and load the raw data into the machine learning pipeline for utilization by using the parsed catalogue as a reference.

In another example, the raw data in the file is in CSV (comma-separated values) format. In another example, the one or more scans on the file are performed on bytes of the raw data. In another example, the items of data are demarcated by a delimiter. In another example, the delimiter is a comma, tab, or pipe. In another example, the items of the raw data are transferred in byte form into the pre-allocated buffer. In another example, the memory footprint is allocated based on a size of the catalogue, wherein a construction of the catalogue includes holding online statistic objects for each column of the raw data, in which the online statistic objects accept data from a respective column's population. In another example, parsing the items of the raw data includes assembling the items within the pre-allocated buffer into a number and pushing the number to a corresponding online statistic object inside the catalogue. In another example, the allocated memory footprint is comprised of pre-allocated arrays for individual objects, including the online statistic objects and flags identified for each column.

A further example includes a computing device configured to parse raw data for use by a machine learning pipeline, comprising: one or more processors; and one or more hardware-based memory devices having instructions which, when executed by the one or more processors, cause the computing device to: determine a size of a memory footprint for a catalogue; allocate the determined size of the memory footprint for the catalogue, in which the allocated memory footprint is utilized during processing of raw data to reduce a number of times the memory footprint is re-allocated in memory; individually transfer a demarcated item from the raw data into a buffer; parse the item of the raw data that is transferred into the buffer into the catalogue, wherein each demarcated item of the raw data is individually and sequentially transferred into the buffer and parsed into the catalogue; and load the raw data into a machine learning pipeline using the catalogue with the parsed items as a reference.

In another example, the buffer is a pre-allocated buffer. In another example, the executed instructions further cause the computing device to parse for delimiters in the raw data that demarcate the items, identify a largest item between delimiters, and create the pre-allocated buffer using a size based on the identified largest item. In another example, the parsing for delimiters and the identification of the largest items are performed on the raw data in byte format. In another example, the executed instructions further cause the computing device to parse the raw data for label distribution, in which the label distribution includes designating user-specified rows of raw data as a training set or a testing set for utilization by the machine learning pipeline, wherein the parsing is performed during a scan in which the computing device parses the raw data for the delimiters and identifies the largest item in the raw data. In another example, the parsed individual items are assembled into a number and the items or parts of the items are pushed to a relevant online statistic object in the catalogue, and wherein the online statistic object is utilized to determine which raw data from the catalogue to load into the machine learning pipeline. In another example, the catalogue is loaded into the machine learning pipeline in a tabular data structure.

A further example includes one or more hardware-based non-transitory computer-readable memory devices storing instructions which, when executed by one or more processors disposed in computing device, cause the computing device to: ingest raw data from a file; perform a first scan on the raw data in the file, by which a memory footprint is allocated for a catalogue; responsive to completion of the first scan, perform a second scan on the raw data in the file by which a pre-allocated buffer is created, wherein a size of the pre-allocated buffer is based on a largest item of raw data in the file, in which items within the raw data are demarcated by delimiters; responsive to completion of the second scan, perform a third scan on the raw data in the file, by which each item of the raw data is individually transferred into the created pre-allocated buffer and parsed into the catalogue; and responsive to completion of the third scan, load the raw data into a machine learning pipeline for utilization, in which the catalogue is used as a reference for which pieces of raw data to load.

In another example, each scan is performed on the raw data as bytes. In another example, items are assembled and pushed into an online statistics object within the catalogue which informs which data within the catalogue is to be loaded into the machine learning pipeline. In another example, the online statistics object includes one or more of variance or prevalence.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a computing device for optimization of a machine learning pipeline, comprising:
    ingesting raw data from a file, in which the raw data has demarcations between items of data;
    performing one or more scans on the file, in which the one or more scans are used to:
    allocate a memory footprint for a catalogue, wherein the memory footprint indicates a maximum amount of memory utilized during a machine learning pipeline optimization process to avoid performance of additional memory allocation operations during subsequent processing,
    create a pre-allocated buffer having a size that is based on the largest sized item of the items of data,
    individually transfer an item of the raw data into the created pre-allocated buffer, and
    parse the transferred item of the raw data into the catalogue responsive to the item of the raw data being transferred into the pre-allocated buffer, wherein each item of the raw data is individually and sequentially transferred into the pre-allocated buffer and parsed into the catalogue;
    load the transferred items of raw data into the machine learning pipeline for utilization by using the parsed catalogue as a reference; and
    training a machine learning model in the machine learning pipeline based on the transferred items of raw data.

2. The method of claim 1, in which the raw data in the file is in CSV (comma-separated values) format.

3. The method of claim 1, in which the one or more scans on the file are performed on bytes of the raw data.

4. The method of claim 1, in which the items of data are demarcated by a delimiter.

5. The method of claim 4, in which the delimiter is a comma, tab, or pipe.

6. The method of claim 1, in which the items of the raw data are transferred in byte form into the pre-allocated buffer.

7. The method of claim 1, in which the memory footprint is allocated based on a size of the catalogue, wherein a construction of the catalogue includes holding online statistic objects for each column of the raw data, in which the online statistic objects accept data from a respective column's population.

8. The method of claim 7, in which parsing the items of the raw data includes:
    assembling the items within the pre-allocated buffer into a number, and
    pushing the number to a corresponding online statistic object inside the catalogue.

9. The method of claim 8, in which the allocated memory footprint is comprised of pre-allocated arrays for individual objects, including the online statistic objects and flags identified for each column.

10. A computing device configured to parse raw data for use by a machine learning pipeline, comprising:
    one or more processors; and
    one or more hardware-based memory devices having instructions which, when executed by the one or more processors, cause the computing device to:
    determine a size of a memory footprint for a catalogue;
    allocate the determined size of the memory footprint for the catalogue, in which the allocated memory footprint is utilized during processing of raw data to reduce a number of times the memory footprint is re-allocated in memory;
    individually transfer a demarcated item from a plurality of demarcated items of the raw data into a buffer wherein a size of the buffer is based on the largest sized item of the demarcated items of data;
    parse the item of the raw data that is transferred into the buffer into the catalogue, wherein each demarcated item of the plurality of demarcated items of the raw data is individually and sequentially transferred into the buffer and parsed into the catalogue;
    load the transferred items of raw data into a machine learning pipeline using the catalogue with the parsed items as a reference; and
    train a machine learning model in the machine learning pipeline based on the transferred items of raw data.

11. The computing device of claim 10, in which the buffer is a pre-allocated buffer.

12. The computing device of claim 11, in which the executed instructions further cause the computing device to:
    parse for delimiters in the raw data that demarcate the items;
    identify a largest item between delimiters; and
    create the pre-allocated buffer using a size based on the identified largest item.

13. The computing device of claim 12, in which the parsing for delimiters and the identification of the largest item are performed on the raw data in byte format.

14. The computing device of claim 12, in which the executed instructions further cause the computing device to parse the raw data for label distribution, in which the label distribution includes designating user-specified rows of raw data as a training set or a testing set for utilization by the machine learning pipeline, wherein the parsing is performed during a scan in which the computing device parses the raw data for the delimiters and identifies the largest item in the raw data.

15. The computing device of claim 10, in which the parsed individual items are assembled into a number and the items or parts of the items are pushed to a relevant online statistic object in the catalogue, and wherein the online statistic object is utilized to determine which raw data from the catalogue to load into the machine learning pipeline.

16. The computing device of claim 10, in which the catalogue is loaded into the machine learning pipeline in a tabular data structure.

17. One or more hardware-based non-transitory computer-readable memory devices storing instructions which, when executed by one or more processors disposed in computing device, cause the computing device to:
  ingest raw data from a file;
  perform a first scan on the raw data in the file, by which a memory footprint is allocated for a catalogue;
  responsive to completion of the first scan, perform a second scan on the raw data in the file by which a pre-allocated buffer is created, wherein a size of the preallocated buffer is based on the largest item of items of raw data in the file, in which the items within the raw data are demarcated by delimiters;
  responsive to completion of the second scan, perform a third scan on the raw data in the file, by which each of the items of the raw data is individually transferred into the created pre-allocated buffer and parsed into the catalogue;
  responsive to completion of the third scan, load the transferred items of the raw data into a machine learning pipeline for utilization, in which the catalogue is used as a reference for which pieces of raw data to load; and
  train a machine learning model in the machine learning pipeline based on the transferred items of raw data.

18. The one or more hardware-based non-transitory computer-readable memory devices of claim 17, in which each scan of the first, second and third scans is performed on the raw data as bytes.

19. The one or more hardware-based non-transitory computer-readable memory devices of claim 17, in which items are assembled and pushed into an online statistics object within the catalogue which informs which data within the catalogue is to be loaded into the machine learning pipeline.

20. The one or more hardware-based non-transitory computer-readable memory devices of claim 19, in which the online statistics object includes one or more of variance or prevalence.

* * * * *